(12) United States Patent
Ishikawa et al.

(10) Patent No.: US 6,220,028 B1
(45) Date of Patent: Apr. 24, 2001

(54) HYDRAULIC DRIVE SYSTEM FOR HYDRAULIC WORK VEHICLE

(75) Inventors: Kouji Ishikawa; Toichi Hirata; Genroku Sugiyama; Tsukasa Toyooka; Tsuyoshi Nakamura; Yasuharu Gotou, all of Ibaraki-ken (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 09/204,068

(22) Filed: Dec. 3, 1998

(30) Foreign Application Priority Data

Dec. 4, 1997 (JP) .................................... 9-334181

(51) Int. Cl.⁷ .................................................. F16D 31/02
(52) U.S. Cl. ............................................................. 60/431
(58) Field of Search ................................................ 60/431

(56) References Cited

U.S. PATENT DOCUMENTS 5,197,284 * 3/1993 Cartner ................................... 60/496
5,447,027 * 9/1995 Ishikawa et al. ...................... 60/420
5,638,677 * 6/1997 Hosono et al. ........................ 60/431

\* cited by examiner

*Primary Examiner*—Edward K. Look
*Assistant Examiner*—Thomas E. Lazo
(74) *Attorney, Agent, or Firm*—Evenson, McKeown, Edwards & Lenahan, P.L.L.C.

(57) ABSTRACT

A hydraulic drive system is provided with a signal guide system for guiding a delivery pressure of a pump as a command pressure via a line and a port, another signal guide system for guiding a pilot pressure of a pilot pump as another command pressure via a line and a port, a tilting control unit for controlling the displacement of the pump by the command pressures guided to the ports, a controller having a command current-setting unit for setting a relationship between a target engine speed and a command current, a target engine speed-indicating unit for an engine, and a solenoid-operated proportional valve for allowing the pilot pressure of the line to pass as is while no drive signal is outputted from the controller but for being reduced in opening to change the pilot pressure to a smaller value when a drive signal is outputted from the controller.

7 Claims, 12 Drawing Sheets

HYDRAULIC DRIVE SYSTEM FOR HYDRAULIC WORK VEHICLE

BACKGROUND OF THE INVENTION a) Field of the Invention

This invention relates to a hydraulic drive system for a hydraulic work vehicle such as a hydraulic excavator, and especially to a hydraulic drive system for a hydraulic work vehicle, which is provided with a tilting control unit for performing both control of a delivery flow rate in accordance with a delivery pressure of a variable displacement hydraulic pump and control of torque to be absorbed in the variable displacement hydraulic pump.

b) Description of the Related Art

As prior art of this type, there is known a hydraulic drive system disclosed in Japanese Patent Application Laid-Open (Kokai) No. SHO 2-129401. FIG. 14 is a hydraulic circuit diagram showing the essential construction of a conventional hydraulic drive system for a hydraulic work vehicle as shown in the above laid-open (kokai) publication.

The hydraulic drive system according to this prior art is provided with a motor, namely, engine 1, a variable displacement hydraulic pump 2 operatively driven by the engine 1, a pilot pump 3, a servo piston valve 4 for controlling a displacement of the variable displacement hydraulic pump 2, a control valve 5 for controlling drive of the servo piston valve 4, and an input valve 6 for controlling drive of the control valve 5.

To a first tilting control signal port 8 of the input valve 6, a first tilting control signal line 7 is connected. These first tilting control signal line 7 and first tilting control signal port 8 make up a first tilting control signal guide system which guides, as a first tilting control signal, a delivery pressure of the variable displacement hydraulic pump 2.

To a second tilting control signal port 10 of the input valve 6, a second tilting control signal line 9 is connected. These second tilting control signal line 9 and second tilting control signal port 10 make up a second tilting control signal guide system which guides a second tilting control signal for controlling torque to be absorbed in the variable displacement hydraulic pump 2.

Further, to a third tilting control signal port 12 of the input valve 6, a third tilting control signal line 11 is connected. These third tilting control signal line 11 and third tilting control signal port 12 make up a third tilting control signal guide system which guides, as a third tilting control signal, a delivery pressure of a variable displacement hydraulic pump constituting a hydraulic pressure source of another hydraulic circuit (not shown).

A solenoid-operated valve 13 is arranged between the pilot pump 3 and the above-mentioned second tilting control signal line 9. This solenoid-operated valve 13 is driven by a drive signal outputted from a controller 14 and supplies a pilot pressure, which is produced at the pilot pump 3, as a second tilting control signal to the second tilting control signal line 9. Namely, the pilot pump 3 constitutes a second tilting control signal generating unit.

The above-mentioned servo piston valve 4, control valve 5 and input valve 6 make up a tilting control unit, which controls a displacement of the variable displacement hydraulic pump 2 in such a way that a delivery flow rate of the variable displacement hydraulic pump 2 decreases as a delivery pressure of the variable displacement hydraulic pump 2, that is, a value of the first tilting control signal increases and which also controls the displacement of the variable displacement hydraulic pump 2 in such a way that torque to be absorbed in the variable displacement hydraulic pump 2 decreases as the value of a pilot pressure outputted through the solenoid-operated valve 13, namely, of the second tilting control signal increases.

In the prior art constructed as described above, when the delivery pressure of the variable displacement hydraulic pump 2 becomes high upon driving and operating an unillustrated actuator, in other words, when the value of the first tilting control signal guided via the first tilting control signal line 7 and the first tilting control signal port 8 increases, a piston of the input valve 6 moves in a rightward direction as viewed in FIG. 14 and as a result, the control valve 5 tends to be changed over to a left position against spring force. As a consequence, control is performed so that the servo piston valve 4 moves in the rightward direction as viewed in FIG. 14 and the displacement of the variable displacement hydraulic pump 2 decreases, in other words, the flow rate of pressure oil delivered from the variable displacement hydraulic pump 2 is suppressed.

While no drive signal is outputted from the controller 14 and the solenoid-operated valve 13 is held at a center valve position as illustrated in FIG. 14, the pilot pressure of the pilot pump 3, namely, the second tilting control signal is not guided to the second tilting control signal port 10 through the second tilting control signal line 9, so that the piston of the input valve 6 is not operated by the second tilting control signal and the torque to be absorbed in the variable displacement hydraulic pump 2 is maintained at a predetermined large value.

Now assume that in a state such as that described above, a drive signal is outputted from the controller 14 in response to a change in the rotational speed (which may hereinafter be also called "engine speed") and the solenoid-operated valve 13 is changed over. A pilot pressure of the pilot pump 3 is then guided to the input valve 6 via the solenoid-operated valve 13 and the second tilting control signal port 10, whereby the piston of the input valve 6 moves in the rightward direction as viewed in FIG. 14. As a consequence, the displacement of the variable displacement hydraulic pump 2 is controlled so that torque to be absorbed in the variable displacement hydraulic pump 2 takes a small value not exceeding output torque of the engine 1. This makes it possible to perform engine power control under which work can be continued without stalling of the engine 1 irrespective of changes in the rotational speed of the engine 1.

In the above-described prior art, the solenoid-operated valve 13 remains held at the center valve position if the controller 14 develops a trouble for a certain cause or breaking takes place in a wire through which the drive signal of the controller 14 is guided to the solenoid-operated valve 13. This makes it impossible to guide the second tilting control signal to the second tilting control signal port 10 through the second tilting control signal line 9. Accordingly, the input valve 6 is not operated by the second tilting control signal so that the torque to be absorbed in the variable displacement hydraulic pump 2 is maintained at a predetermined large value.

FIG. 15 illustrates an engine speed/engine output torque characteristic available from the prior art shown in FIG. 14. In FIG. 15, numeral 15 indicates a characteristic curve representing engine output torque, and a straight line indicated by numeral 16 is a characteristic line representing the above-described torque to be absorbed in the variable displacement hydraulic pump 2, said torque having a predetermined large value TA.

As is illustrated in FIG. 15, the torque to be absorbed in the variable displacement hydraulic pump 2 is fixed to one having the large value TA in the prior art if the controller 14 develops a trouble or breaking takes place in the wire connecting the controller 14 and the solenoid-operated valve 13 with each other. When the engine speed changes to a low engine speed NS, the value TN of the engine output torque therefore becomes smaller than the value TA of the torque to be absorbed, resulting in the problem that the engine 1 is stalled. To continue the work performed by the hydraulic work vehicle, a special operation is therefore needed such as increasing the engine speed, leading to a problem that the ease in performing work is significantly lowered.

SUMMARY OF THE INVENTION

The present invention has been completed in view of the above-described current situation of the prior art. An object of the present invention is therefore to provide a hydraulic drive system for a hydraulic work vehicle, which makes it possible to drive a variable displacement hydraulic pump without inducing stalling of a motor even when the rotational speed of a motor drops while there is a trouble in an electric system which controls torque to be absorbed in the variable displacement hydraulic pump.

To achieve the above object, the present invention as defined in claim 1 provides a hydraulic drive system for a hydraulic work vehicle, said system being provided with:

a motor, a variable displacement hydraulic pump operatively driven by the motor, a first tilting control signal guide system for guiding, as a first tilting control signal, a delivery pressure of the variable displacement hydraulic pump, a second tilting control signal guide system for guiding a second tilting control signal adapted to control torque to be absorbed in the variable displacement hydraulic pump, a unit for generating the second tilting control signal, and a tilting control unit for controlling a displacement of the variable displacement hydraulic pump so that a delivery flow rate of the variable displacement hydraulic pump decreases as a value of the first tilting control signal increases and the torque to be absorbed in the variable displacement hydraulic pump decreases as a value of the second tilting control signal increases, characterized in that the hydraulic drive system comprises:

a controller;

a unit for outputting to the controller an upper limit signal which determines an upper limit of the torque to be absorbed in the variable displacement hydraulic pump; and a control device arranged in the second tilting control signal guide system and operatively controlled by a drive signal outputted from the controller to perform control so that, when the drive signal is not outputted from the controller, the second tilting control signal is maintained at a predetermined large value and, when the drive signal is outputted from the controller in correspondence to the upper limit signal outputted from the upper limit signal output unit and determining the upper limit of the torque to be absorbed in the pump, the value of the second tilting control signal is changed from the predetermined large value to a small value.

According to the invention of claim 1 constructed as described above, when the upper limit signal output unit is operated, the drive signal which corresponds to the upper limit of the absorption torque determined by the upper limit signal output unit is outputted to the control device from the controller, whereby the value of the second tilting control signal guided to the second tilting control signal guide system is controlled by the control device so that it changes from the large value to the small value. Therefore, the second tilting control signal of this small value is supplied to the tilting control unit, and this tilting control unit controls the displacement of the variable displacement hydraulic pump so that the torque to be absorbed in the variable displacement hydraulic pump has a relatively large upper limit. This makes it possible to supply pressure oil at a desired flow rate from the variable displacement hydraulic pump while performing power control so that the torque to be absorbed in the variable displacement hydraulic pump takes as close a value as possible to the output torque from the motor within a range not exceeding the output torque from the motor.

If a trouble arises in an electric system controlling the torque, which is to be absorbed in the variable displacement hydraulic pump, due to a trouble in the controller or a like trouble in such a situation, the second tilting control signal guided by the second tilting control signal guide system is maintained at the predetermined large value by the control device, and in accordance with the second tilting control signal having the predetermined large value, the tilting control unit controls the displacement of the variable displacement hydraulic pump so that the torque to be absorbed in the variable displacement hydraulic pump decreases. As a consequence, even if a problem arises so that the output torque of the motor decreases as the rotational speed of the motor drops, the torque to be absorbed in the variable displacement hydraulic pump can be maintained at a value still smaller than the thus-decreased output torque of the motor. In other words, even if the rotational speed of the motor drops while there is a trouble developed in the electric system which controls the torque to be absorbed in the variable displacement hydraulic pump, the driving by the motor can be continued without stalling of the motor.

The invention as recited in claim 2 is constructed so that in the above-described invention according to claim 1, the second tilting control signal generating unit is a pilot pump operatively driven by the motor, the second tilting control signal is a pilot pressure delivered from the pilot pump, the second tilting control signal guide system comprises a tilting control signal line for guiding the pilot pressure, and the control device is a solenoid-operated proportional valve arranged in the tilting control signal line.

According to the invention of claim 2 constructed as described above, when the upper limit signal output unit is operated, the drive signal which corresponds to the upper limit of absorption torque as determined by the upper limit signal output unit is outputted to the solenoid-operated proportional valve from the controller, and the solenoid-operated proportional valve is switched over in a closing direction so that the value of the pilot pressure guided to the second tilting control signal line is controlled to the small value from the predetermined large value. Therefore, the pilot pressure of this small value is supplied to the tilting control unit, whereby the tilting control unit controls the torque, which is to be absorbed in the variable displacement hydraulic pump, so that its upper limit becomes relatively large. This makes it possible to supply pressure oil at a desired flow rate from the variable displacement hydraulic pump while performing power control so that the torque to be absorbed in the variable displacement hydraulic pump takes as close a value as possible to the output torque of the motor within a range not exceeding the output torque of the motor.

If a trouble arises in the electric system controlling the torque, which is to be absorbed in the variable displacement hydraulic pump, due to a trouble in the controller or a like trouble in such a situation, the solenoid-operated proportional pump is brought into the center valve position, for example, into a fully-open position. The pilot pressure of the large value delivered from the pilot pump is therefore guided, as is, to the tilting control unit through the tilting control signal line, and in accordance with the pilot pressure of the large value, the tilting control unit performs control so that the torque to be absorbed in the variable displacement hydraulic pump decreases. This allows the driving by the motor to continue without stalling of the motor as described above, even if the rotational speed of the motor drops.

The invention as recited in claim 3 is constructed so that in the above-described invention according to claim 1 or 2, the upper limit signal output unit is a target rotational speed indicating unit for indicating a target rotational speed of the motor.

According to the invention of claim 3 constructed as described above, the upper limit of the torque to be absorbed in the variable displacement hydraulic pump is determined in accordance with operation of the rotational speed indicating unit for the motor.

The invention as recited in claim 4 is constructed so that in the above-described invention according to any one of claims 1–3, the upper limit signal output unit is a mode selector switch arranged in association with modes of work by the hydraulic work vehicle.

According to the invention of claim 4 constructed as described above, the upper limit of the torque to be absorbed in the variable displacement hydraulic pump is determined in accordance with changing-over of the mode selector switch operated corresponding to a desired work mode.

The invention as recited in claim 5 is constructed so that in the above-described invention according to any one of claims 1–3, the hydraulic drive system further comprises an actuator, which is operative by pressure oil delivered from the variable displacement hydraulic pump, and a center bypass passage for controlling drive of the actuator; and the tilting control unit comprises a unit for controlling a displacement of the variable displacement hydraulic pump so that the displacement increases as a flow rate of pressure oil, which is flowing through the center bypass passage, decreases.

The invention as recited in claim 6 is constructed so that in the above-described invention according to any one of claims 1–3, the upper limit signal output unit is a rotational speed detector for detecting an actual rotational speed of the motor.

The invention as recited in claim 7 is constructed so that in the above-described invention according to any one of claims 1–6, the hydraulic work vehicle is a hydraulic excavator.

The invention according to each of the claims can operate the motor without inducing stalling of the engine even when the rotational speed of the motor drops while there is a trouble in the electric system for controlling torque to be absorbed in the variable displacement proportional pump. Accordingly, it does not require any special operation which has heretofore been needed upon such stalling of the motor. This has made it possible to avoid a reduction in the ease of work, which has heretofore taken place as a result of stalling of the motor.

According to the invention recited especially in claim 3, the target rotational speed-indicating unit for the motor, which a hydraulic drive system including the motor is usually equipped with, also serves as the upper limit signal output unit for outputting an upper limit signal to determine the upper limit of torque to be absorbed in the variable displacement hydraulic pump. The hydraulic drive system is simple in construction and can be manufactured at low cost.

According to the invention recited especially in claim 4, the mode selector switch is arranged as the above-mentioned upper limit output unit. Change-over of the mode selector switch can easily maintain torque, which is to be absorbed in the variable displacement hydraulic pump, at a constant level suitable for work to be performed by the hydraulic work vehicle.

According to the invention recited especially in claim 5, the tilting control unit includes the unit for controlling the displacement of the variable displacement hydraulic pump so that the displacement increases as the flow rate of pressure oil flowing through the center bypass passage decreases. The displacement of the variable displacement hydraulic pump is therefore maintained minimum as long as the directional control valve is held at the center valve position. This makes it possible to reduce the fuel consumption.

DETAILED DESCRIPTION OF THE INVENTION AND PREFERRED EMBODIMENTS

Embodiments of the hydraulic drive system for the hydraulic work vehicle, said system pertaining to the present invention, will hereinafter be described with drawings.

Figure 1:
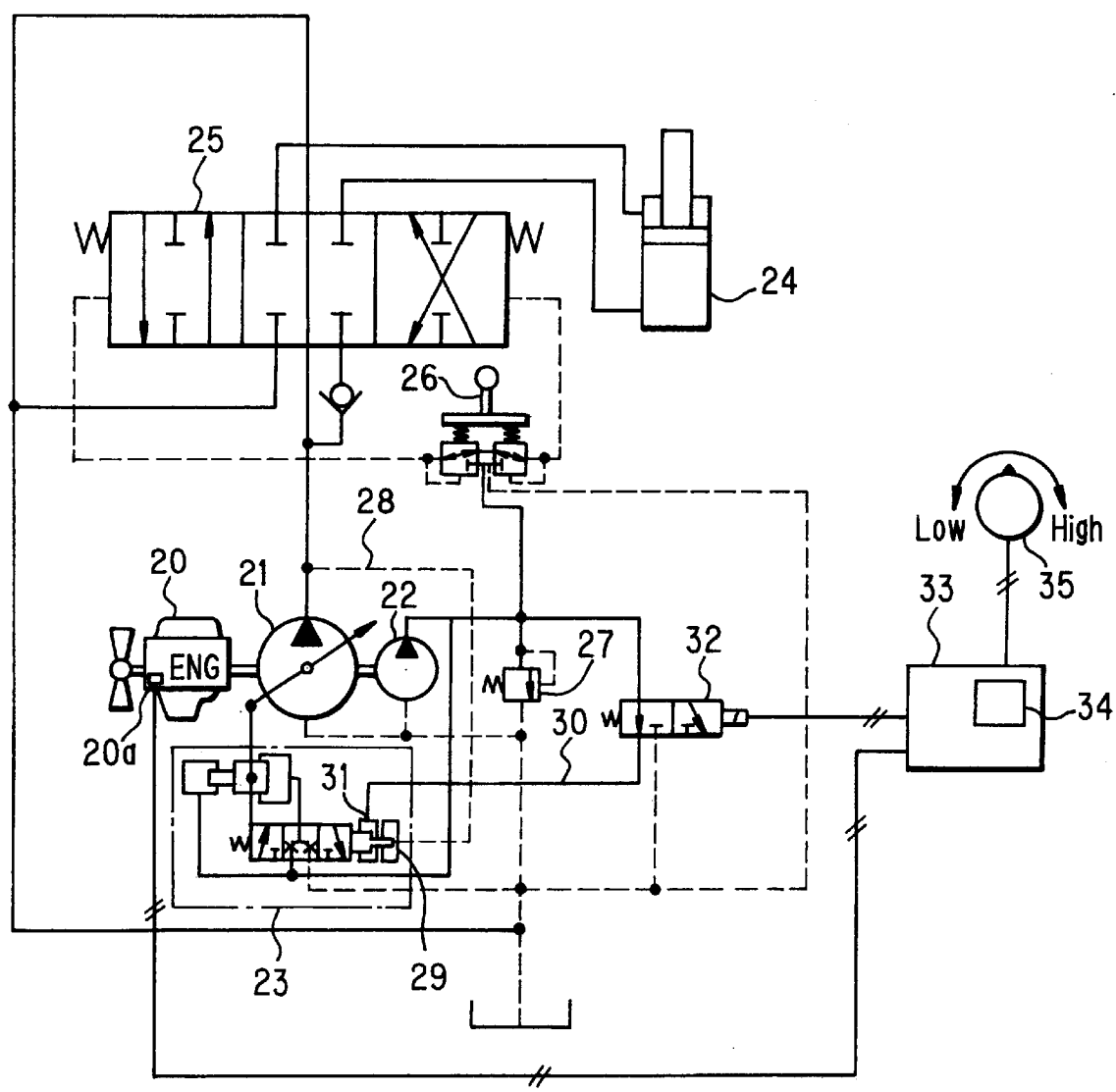
FIG. 1 is a hydraulic circuit diagram a first embodiment of the hydraulic drive system for the hydraulic work vehicle, said system pertaining to the present invention.
Figure 2:
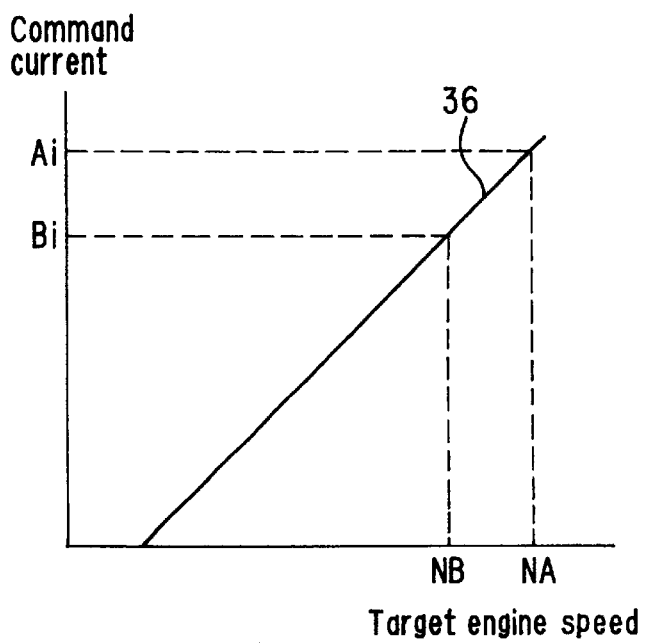
FIG. 2 is a diagram illustrating a relationship between a target engine speed, which is set by a command current-setting unit built in a controller arranged in the first embodiment shown in FIG. 1, and a command current.
Figure 3:
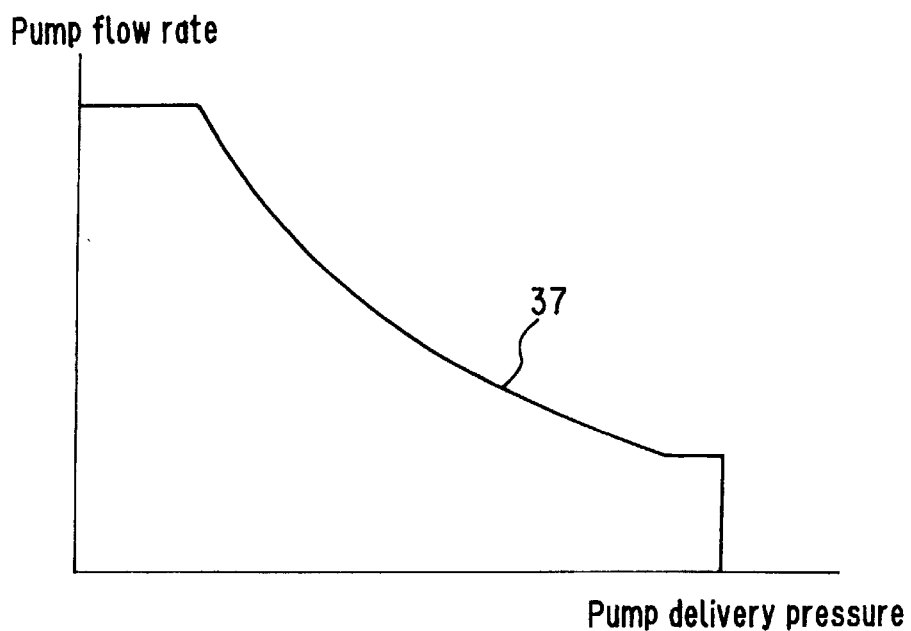
FIG. 3 is a diagram depicting characteristics of a variable displacement hydraulic pump arranged in the first embodiment shown in FIG. 1.
Figure 4:
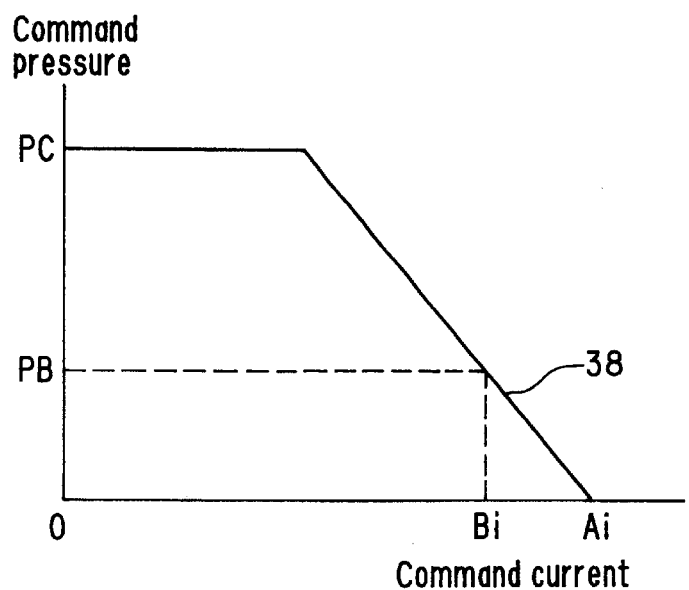
FIG. 4 is a diagram depicting characteristics of a solenoid-operated proportional valve arranged in the first embodiment shown in FIG. 1.
Figure 5:
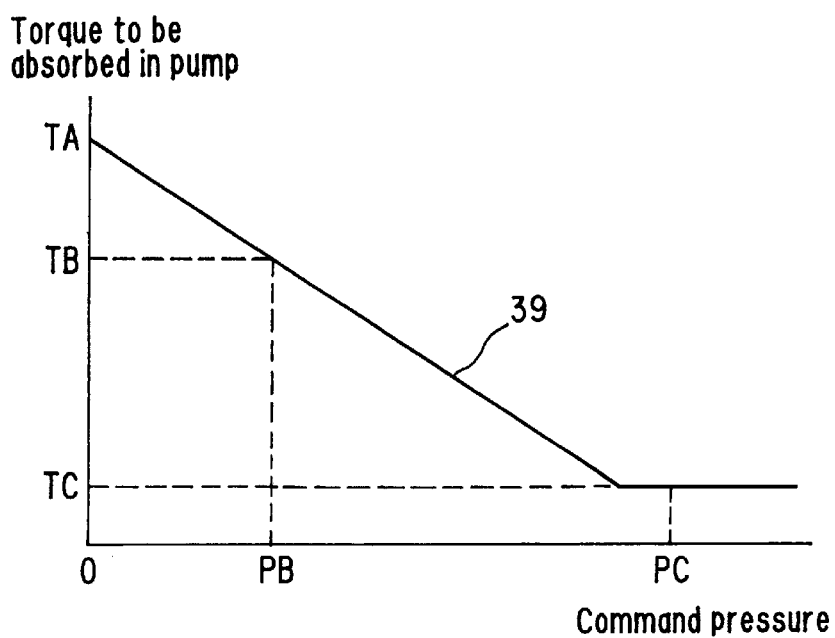
FIG. 5 is a diagram illustrating a command pressure/pump-absorbed torque characteristic available from the first embodiment shown in FIG. 1.
Figure 6:
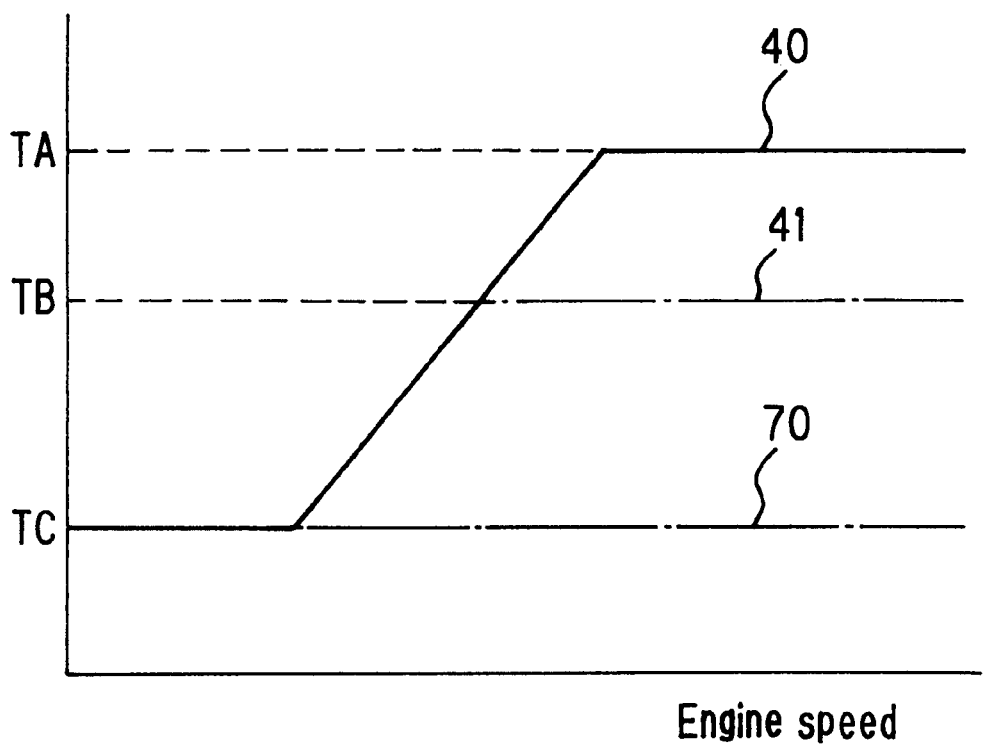
FIG. 6 is a diagram depicting an engine speed/pump-absorbed torque characteristic available from the first embodiment shown in FIG. 1.

FIG. 1 is a circuit diagram showing a first embodiment of the hydraulic drive system for the hydraulic work vehicle, said system pertaining to the present invention. FIG. 2 is a diagram illustrating a relationship between a target engine speed, which is set by a command current-setting unit built in a controller arranged in the first embodiment shown in FIG. 1, and a command current. FIG. 3 is a diagram depicting characteristics of a variable displacement hydraulic pump arranged in the first embodiment shown in FIG. 1. FIG. 4 is a diagram depicting characteristics of a solenoid-operated proportional valve arranged in the first embodiment shown in FIG. 1. FIG. 5 is a diagram illustrating a command pressure/pump-absorbed torque characteristic available from the first embodiment shown in FIG. 1. FIG. 6 is a diagram depicting an engine speed/pump-absorbed torque characteristic available from the first embodiment shown in FIG. 1.

The first embodiment shown in FIG. 1 is arranged, for example, in a hydraulic excavator, and is provided with a motor, namely, engine 20, a fuel injector 20a for controlling the rotational speed of the engine 20, a variable displacement hydraulic pump 21 and pilot pump 22 operatively driven by the engine 20, a tilting control unit 23 for controlling the displacement of the variable displacement hydraulic pump 21, an actuator 24 operatively driven by pressure oil delivered from the variable displacement hydraulic pump 21, a directional control valve 25 for controlling the flow of pressure oil supplied to the actuator 24 from the variable displacement hydraulic pump 21, and a control lever 26 for changing over the directional control valve 25.

The variable displacement hydraulic pump 21 is controlled in displacement by the tilting control unit 23 so that a pump delivery pressure/pump flow rate characteristic shown by a characteristic line 37 in FIG. 3 is obtained.

The tilting control unit 23 is provided with a first tilting control signal port 29, to which a first tilting control signal line 28 is connected. These first tilting control signal line 28 and first tilting control signal port 29 make up a first tilting control signal guide system for guiding, as a first tilting control signal, a delivery pressure of the variable displacement hydraulic pump 21.

Further, the tilting control unit 23 is also provided with a second tilting control signal port 31, to which a second tilting control signal line 30 is connected. These second tilting control signal line 30 and second tilting control signal port 31 make up a second tilting control signal guide system for guiding a second tilting control signal which controls torque to be absorbed in the variable displacement hydraulic pump 21.

The second tilting control signal line 30 is connected to the above-mentioned pilot pump 22, and guides a pilot pressure, which is produced at the pilot pump 22 and is then regulated at a pilot relief valve 27, as a second tilting control signal, i.e., a command pressure. Namely, the pilot pump 22 makes up the second tilting control signal generating unit.

The tilting control unit 23 controls the displacement of the variable displacement hydraulic pump 21 so that as is indicated by the characteristic line 37 in FIG. 3, the delivery flow rate of the variable displacement hydraulic pump decreases as the value of the first tilting control signal increases, and also controls the displacement of the variable displacement hydraulic pump 21 so that as is indicated by a characteristic line 39 in FIG. 5, the torque to be absorbed in the variable displacement hydraulic pump 21 decreases as the value of the pilot pressure guided through the second tilting control signal line 30, namely, of the command pressure as the second tilting control signal increases.

Figure 14:
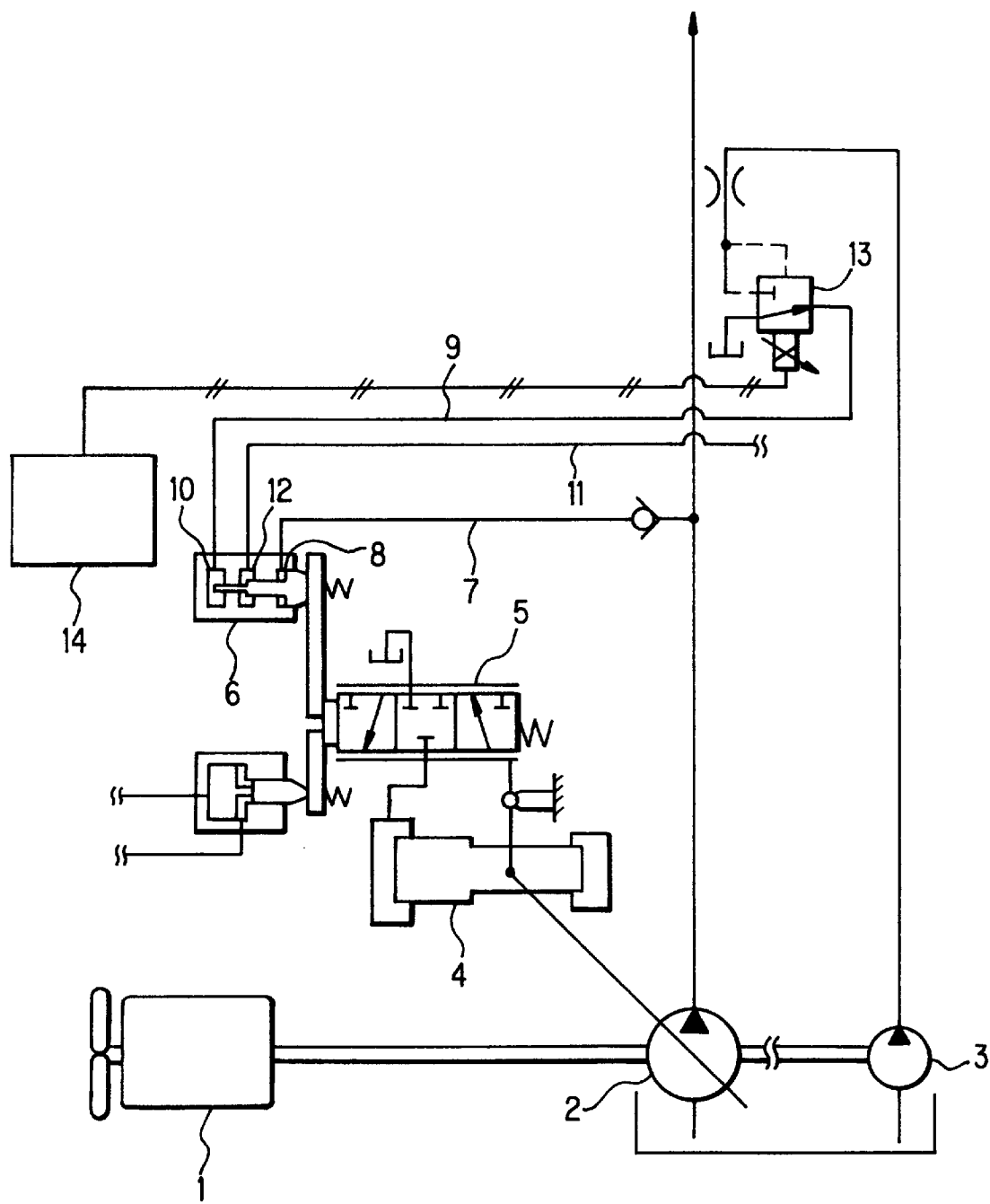
FIG. 14 is a hydraulic circuit diagram showing the essential construction of a conventional hydraulic drive system for a hydraulic work vehicle.
Figure 15:
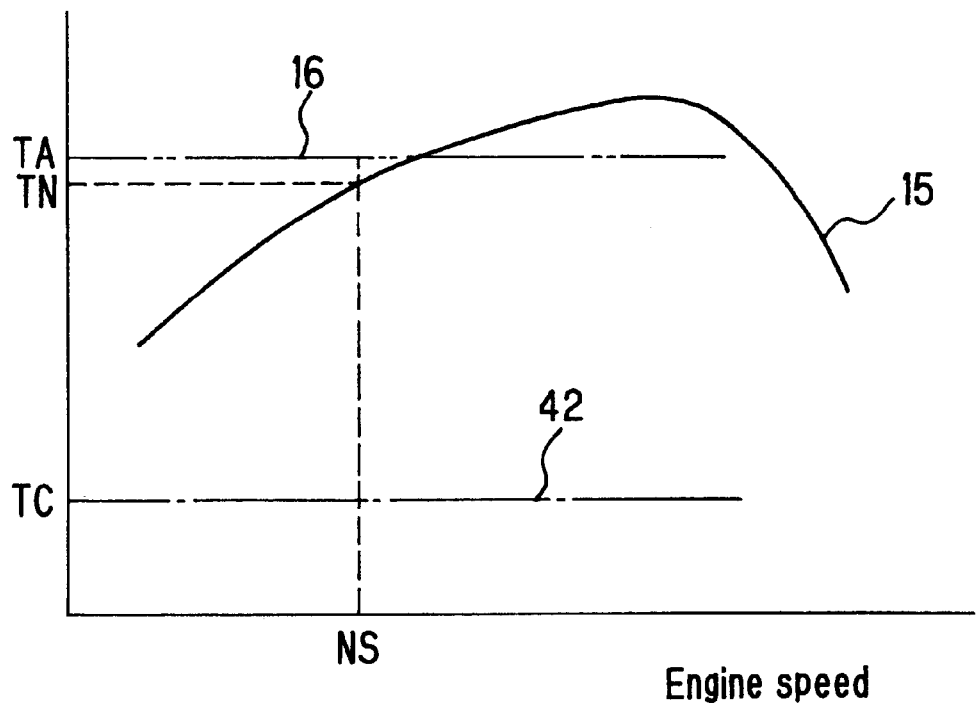
FIG. 15 is a diagram illustrating an engine speed/engine output torque characteristic available from the conventional hydraulic drive system of FIG. 14 for the hydraulic work vehicle.

The construction which has been described above is substantially the same as the above-described prior art shown in FIG. 14.

In particular, the first embodiment is provided with a controller 33, which accommodates therein a command current-setting unit 34 which sets the target engine speed/command current characteristic shown in FIG. 2, and also with an upper limit signal output unit for outputting to the controller 33 an upper limit signal for determining the upper limit of torque to be absorbed in the variable displacement hydraulic pump 21, for example, a target engine speed-indicating unit 35 for indicating a target rotational speed of the engine 20.

The relationship between a target engine speed and a command current, said relationship being set by the command current-setting unit 34 built in the controller 33, is set in such a way that as is indicated by a characteristic line 36 in FIG. 2, for example, the command current increases substantially in proportion to the target engine speed. In FIG. 2, NA indicates a maximum value of the target engine speed, and Ni designates a maximum value of the command current, said maximum value Ni corresponding to the maximum value NA. Further, NB indicates a relatively large target engine speed although NB is a value smaller than the maximum value Na of the target engine speed, and Bi designates a relatively large command current although Bi is a value smaller than the maximum value Ai of the command current. Where work to be performed by the hydraulic excavator is routine heavy-load work such as digging work, for example, a target engine speed of the maximum value NA is outputted from the target engine speed-indicating unit 35. Where work to be performed by the hydraulic excavator is light-load work such as "leveling work" for forming the ground flat, a target engine speed of the value NB is outputted from the target engine speed-indicating unit 35.

Also arranged is an adjusting unit, for example, a solenoid-operated proportional valve 32 disposed in the second tilting control signal line 30 which is included in the second tilting control signal guide system. This solenoid-operated proportional valve 32 is controlled by a drive signal outputted from the controller 33. When no drive signal is outputted from the controller 33, the solenoid-operated proportional valve 32 maintains at a predetermined large value the value of the pilot pressure guided to the second tilting control signal line 30, in other words, of the command pressure as the second tilting control signal. When a signal corresponding to the upper limit of the torque to be absorbed in the pump and outputted from the command current-setting unit 34, that is, a drive signal corresponding to the relevant target engine speed is outputted from the controller 33, the solenoid-operated proportional valve 32 changes the value of the second tilting control signal from the predetermined large value to a small value. This solenoid-operated proportional valve 32 is changed over, for example, in such a mode that it is brought into a fully-open state at the center valve position and its opening decreases as the value of the drive signal outputted from the controller 33 increases.

The first embodiment constructed as described above operates as will be described hereinafter.

Upon performing digging work as heavy-load work by the hydraulic excavator, for example, the target engine speed-indicating unit 35 is operated toward the "high" side in FIG. 1 so that a target engine speed of the maximum value NA is outputted. In response to input of this maximum value NA, the controller 33 outputs to the fuel injector 20a an engine-speed control signal which corresponds to the maximum value NA. As a consequence, the engine 20 operates at a rotational speed corresponding to the maximum value NA of the target engine speed. Further, upon input of the above-mentioned maximum value NA of the engine speed to the controller 33 as mentioned above, the maximum value Ai of the command current is selected from the relationship set by the command current-setting unit 34 and shown in FIG. 2, and a drive signal corresponding to this maximum value Ai of the command current is outputted to the solenoid-operated proportional valve 32 from the controller 33. As a consequence, the solenoid-operated proportional valve 32 is brought, for example, into a fully-closed state, so that the second tilting control signal line 30 is shut off and, as is indicated by a characteristic line 38 in FIG. 4, the second tilting control signal, namely, the command pressure to the second tilting control signal port 31 shown in FIG. 1 becomes 0. As the command pressure is 0 as mentioned above, the tilting control unit 23 controls the displacement of the variable displacement hydraulic pump 21 so that the torque to be absorbed in the pump takes the maximum value TA as indicated by the characteristic line 39 of the command pressure/pump-absorbed torque characteristic in FIG. 5. As a result, the engine speed/pump-absorbed torque characteristic becomes as indicated by a characteristic line in FIG. 6. As a consequence, the digging work can be performed by supplying pressure oil at the desired flow rate from the variable displacement hydraulic pump 21 to the actuator 24 via the directional control valve 25 shown in FIG. 1 while performing power control in such a way that the torque TA to be absorbed in the variable displacement hydraulic pump 21 takes as close a value as possible to the output torque of the engine 20 within a range not exceeding the output torque of the engine 20.

When "leveling work" as light-load work is performed by the hydraulic excavator, for example, the target engine speed-indicating unit 35 is operated to the "low" side from the above-mentioned position so that the value NB smaller than the maximum value NA of the target engine speed is outputted. In response to input of the target engine speed of this value NB, the controller 33, in a similar manner as described above, outputs to the fuel injector 20a an engine-speed control signal which corresponds to the target value NB of the engine speed. As a consequence, the engine 20 operates at a rotational speed corresponding to the target value NA of the engine speed. Further, upon input of the above-mentioned target value NB of the engine speed to the controller 33, the value Bi of the command current smaller than the maximum value Ai is selected from the relationship set by the command current-setting unit 34 and shown in FIG. 2, and a drive signal corresponding to this value Bi of the command current is outputted to the solenoid-operated proportional valve 32. The solenoid-operated proportional valve 32 is therefore changed from the fully-closed state and is brought into an open state although the opening is slight. As a consequence, the value of the second tilting control signal, namely, the command pressure increases from 0 to a value PB as is indicated in FIG. 4 by the characteristic line 38 which indicates a relationship between a command current and a command pressure, and this value PB is supplied to the tilting control signal port 31 shown in FIG. 1. As a result of the change of the command pressure to the value PB as described above, the tilting control unit 23 controls the displacement of the variable displacement hydraulic pump 21 so that the torque to be absorbed in the pump takes the value TB slightly smaller than the above-mentioned maximum value TA as indicated by the characteristic line 39 of the command pressure/pump-absorbed torque characteristic in FIG. 5. As a result, the engine speed/pump-absorbed torque characteristic becomes as indicate by a characteristic line 41 in FIG. 6. It is therefore possible to perform "leveling work" by supplying pressure oil at the desired flow rate from the variable displacement hydraulic pump 21 to the actuator 24 via the direction control valve 25 shown in FIG. 1 while performing power control in such a way that the torque TB to be absorbed in the variable displacement hydraulic pump 21 takes as close a value as possible to the output torque of the engine 20 within a range not exceeding the output torque of the engine 20.

Incidentally, the target engine speed-indicating unit 35 can indicate a desired target engine speed within a range of from the maximum value VA of the target engine speed to its minimum value. In accordance with the value of a target engine speed, the value of torque to be absorbed in the pump can be controlled at a desired value between the maximum value TA and 0 as shown in FIG. 5.

If a trouble arises in the controller 33 shown in FIG. 1 or in the electric system connecting the controller 33 and the solenoid-operated proportional valve 32 with each other in such a situation as described above, the solenoid-operated proportional pump 32 is maintained in the center valve position shown in FIG. 1, that is, remains in the fully-open position. The second tilting control signal line 30 therefore allows the pilot pressure of the large value, which has been delivered from the pilot pump 22, to pass as is, so that this pilot pressure is guided as the command pressure PC shown in FIG. 4 to the second tilting control signal port 31. The tilting control unit 23 therefore controls the displacement of the variable displacement hydraulic pump 21 so that the torque to be absorbed in the pump takes the minimum value TC corresponding to the command pressure PC as is indicated by the characteristic line 39 in FIG. 5. As a consequence, the engine speed/pump-absorbed torque characteristic can be indicated by a characteristic line 70 in FIG. 6. Even if the output torque of the engine drops to the value TN or lower as a result of a reduction of the engine speed to NS or lower, the pump-absorbed torque having this minimum value TC is located on a lower side of the characteristic line 15 which indicates the output torque of the engine. Even if the rotational speed of the engine 20 drops while the electric system has such a trouble, the engine 20 is therefore allowed to continue operating without stalling. As a result, digging work, leveling work or the like, which is being performed by the hydraulic excavator, can be performed without any special operation, thereby making it possible to avoid a reduction in the ease of work.

Further, the first embodiment is simple in construction and hence permits a reduction in manufacturing cost, because the target engine speed-indicating unit 35, which is usually arranged in the hydraulic drive system with the engine 20 incorporated therein, also serves as an upper limit signal output unit for outputting an upper limit signal to determine an upper limit of torque to be absorbed in the variable displacement hydraulic pump 21.

Figure 7:
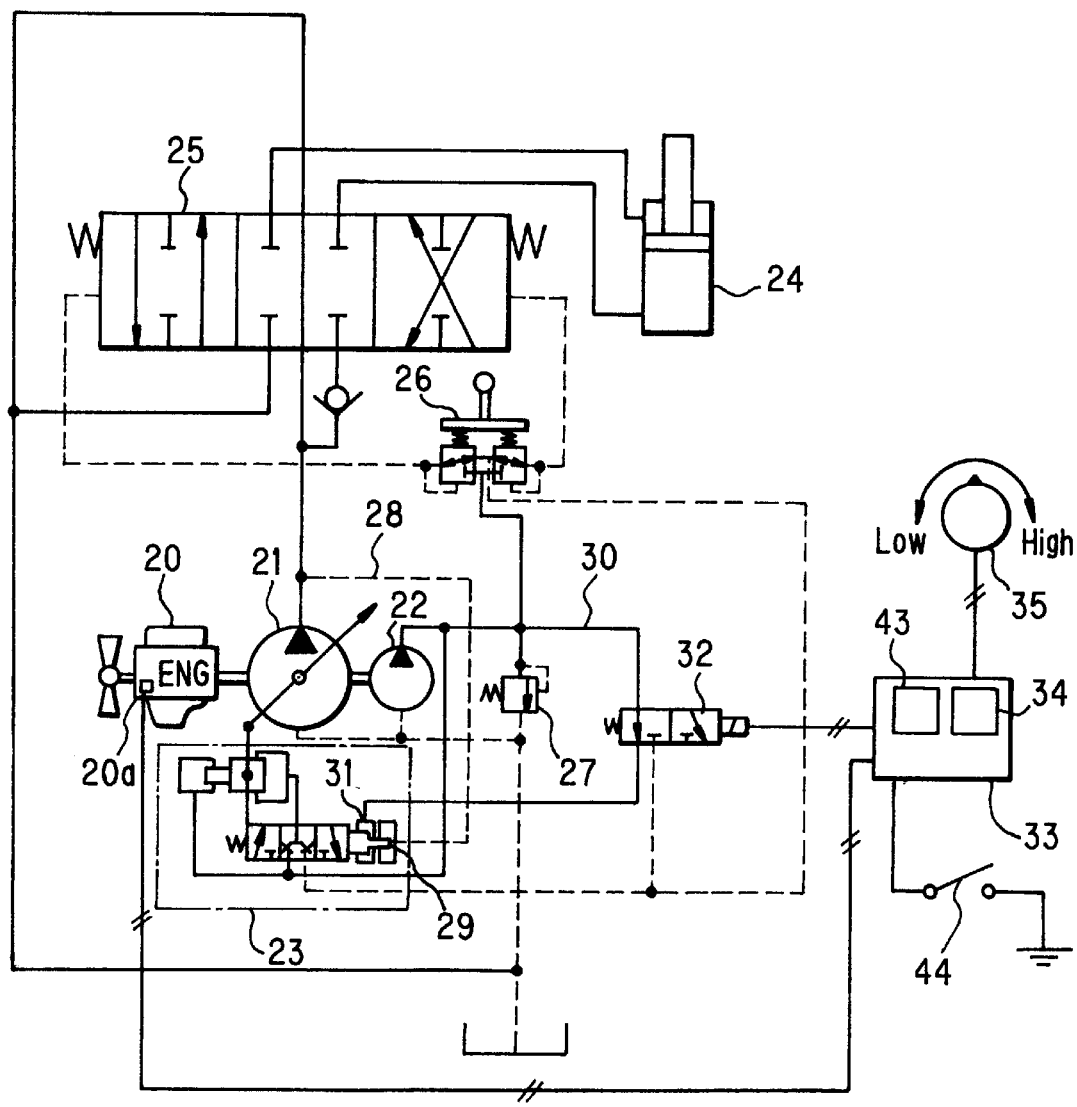
FIG. 7 is a hydraulic circuit diagram showing a second embodiment of the present invention.

FIG. 7 is a hydraulic circuit diagram showing a second embodiment of the present invention.

This second embodiment is provided, as an upper limit signal output unit for outputting to a controller 33 an upper limit signal to determine an upper limit of torque to be absorbed in the variable displacement hydraulic pump 2, with the same target engine speed-indicating unit 35 as that arranged in the above-described first embodiment and also with a mode selector switch 44 arranged in association with a mode of work by the hydraulic excavator, for example, the above-mentioned "leveling work mode" which is a light-load work. The controller 33 is internally provided with a command current-setting unit 43 for storing, for example, the above-mentioned command current Bi in addition with the command current-setting unit 34 which sets a relationship between a target engine speed and a command current. When no mode signal is outputted from the mode selector switch 44, the controller 33 determines a command current, which corresponds to a target engine speed outputted from the target engine speed-indicating unit 35, based on the relationship set at the command current-setting unit 34, and outputs the thus-determined command current as a drive current. When it is determined that a mode signal is being outputted from the mode selector switch 44, the command current Bi stored in the command current-setting unit 43 is outputted as a drive signal no matter whether or not a target engine speed has been inputted from the target engine speed-indicating unit 35.

The second embodiment constructed as described above can bring about similar advantageous effects as those available from the above-mentioned first embodiment. In addition, when the mode selector switch 44 is closed and the mode signal is outputted to the controller 33, the command current Bi set by the command current-setting unit 43 is outputted as a drive signal to the solenoid-operated proportional valve 32. In accordance with the command current, the second tilting control signal, namely, the command pressure which is to be supplied to the second tilting control signal port 31 as described above is changed to PB (because of the relationship shown in FIG. 4). The displacement of the variable displacement hydraulic pump 21 is then controlled by the tilting control unit 23 so that the torque to be absorbed in the pump becomes TB which corresponds to the command pressure PB (because of the relationship shown in FIG. 5). As a result, the relationship between an engine speed and a pump-absorbed torque becomes as indicated by the characteristic line 41 in FIG. 6, and the desired "leveling work" can hence be performed as described above.

According to the second embodiment constructed as described above, closure of the mode selector switch 44 makes it possible to always control the torque, which is to be absorbed in the variable displacement hydraulic pump 21, at a constant level suitable for "leveling work" performed by the hydraulic excavator.

The second embodiment is provided with both the target engine speed-indicating unit 35 and the mode selector switch 44. It is however possible to omit the target engine speed-indicating unit 35 or to design the target engine speed-indicating unit 35 into a construction irrelevant to the control of drive of the solenoid-operated proportional valve 32 although the solenoid-operated proportional valve 32 is arranged, so that the control of drive of the drive of the solenoid-operated proportional valve 32 is performed by relying upon the mode selector switch 44 alone. In addition, a plurality of mode selector switches 44 as described above may be arranged corresponding to plural work modes such as heavy-load work and light-load work, respectively. In the modification constructed as described above, it is only necessary to selectively close one of the mode selector switches 44, which corresponds to a desired work mode. This makes it possible to easily obtain torque, which is to be absorbed in the variable displacement hydraulic pump 21, at a level for the desired work mode by the same operation as that described above.

Figure 8:
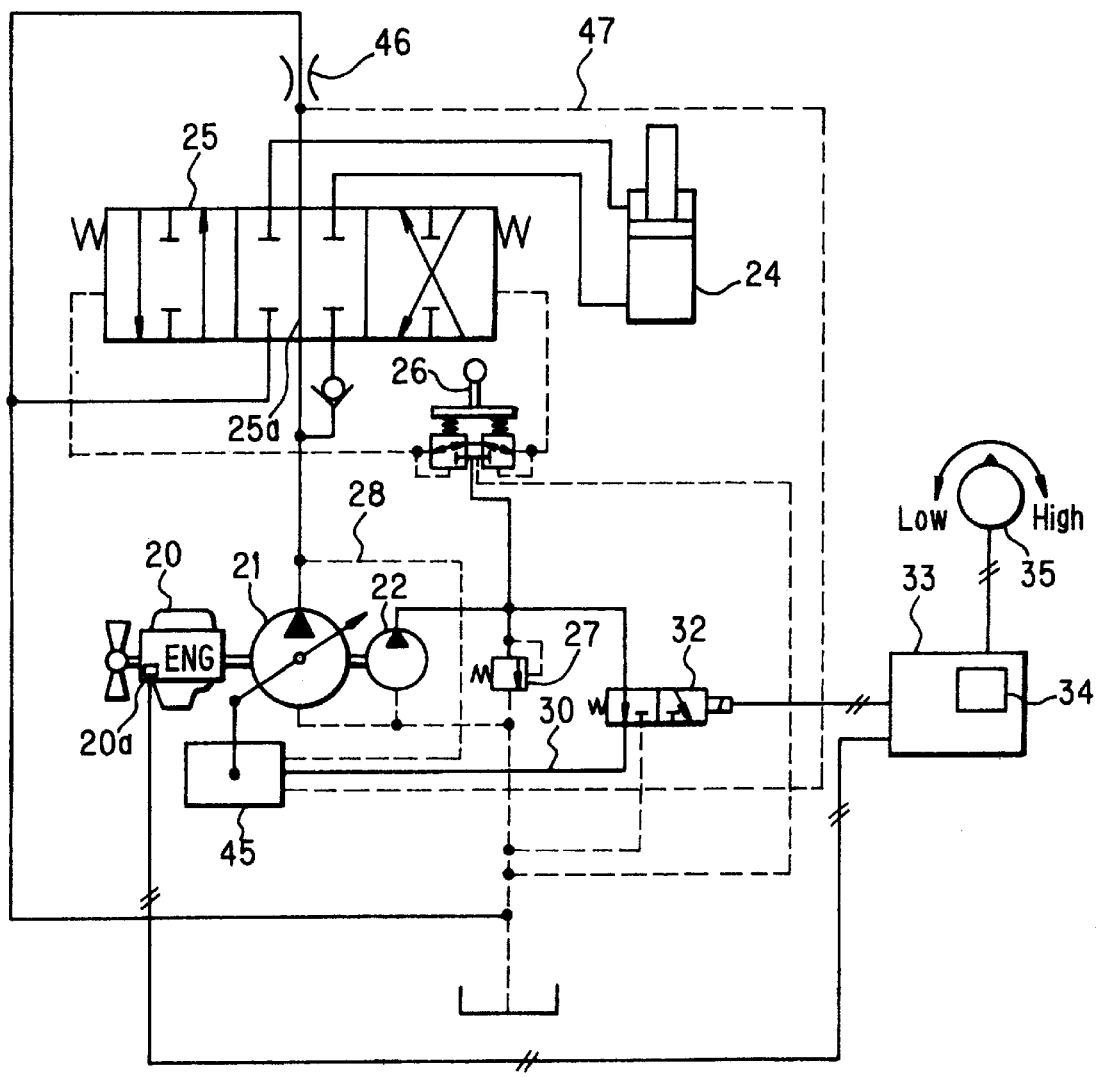
FIG. 8 is a hydraulic circuit diagram showing a third embodiment of the present invention.
Figure 9:
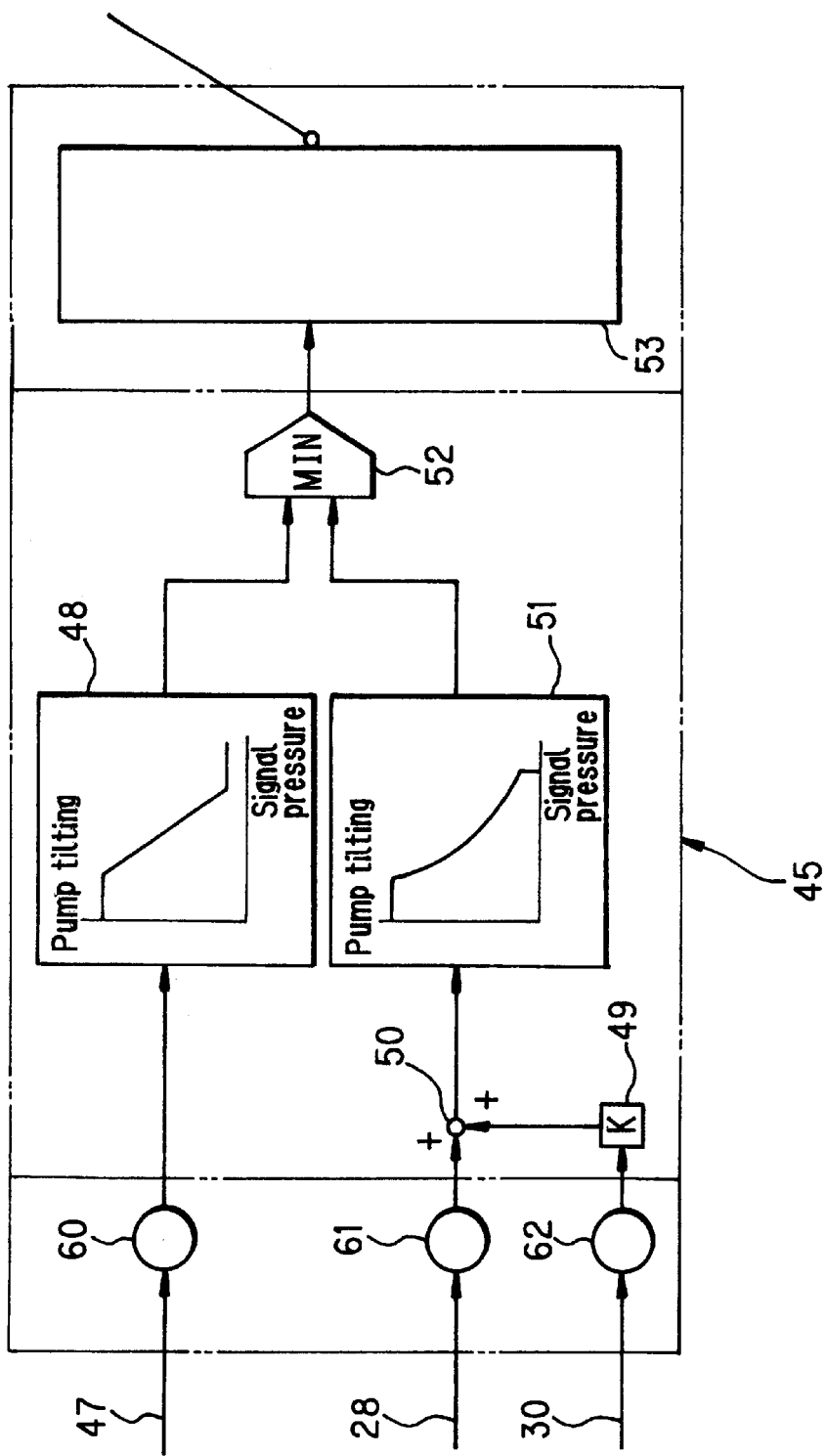
FIG. 9 is a block diagram illustrating the construction of a tilting control unit arranged in the third embodiment shown in FIG. 8.
Figure 10:
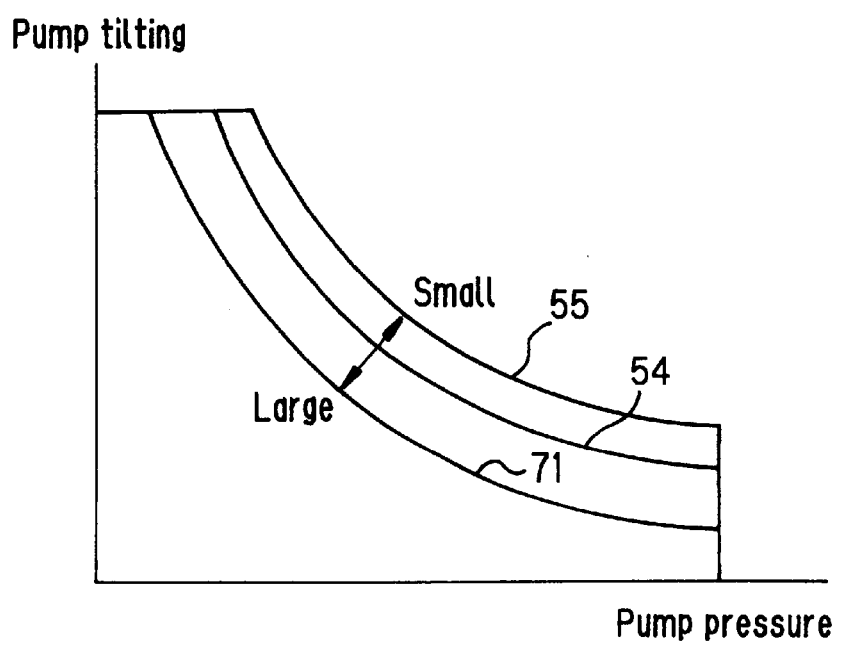
FIG. 10 is a diagram illustrating a pump output characteristic available from the third embodiment shown in FIG. 8.
Figure 11:
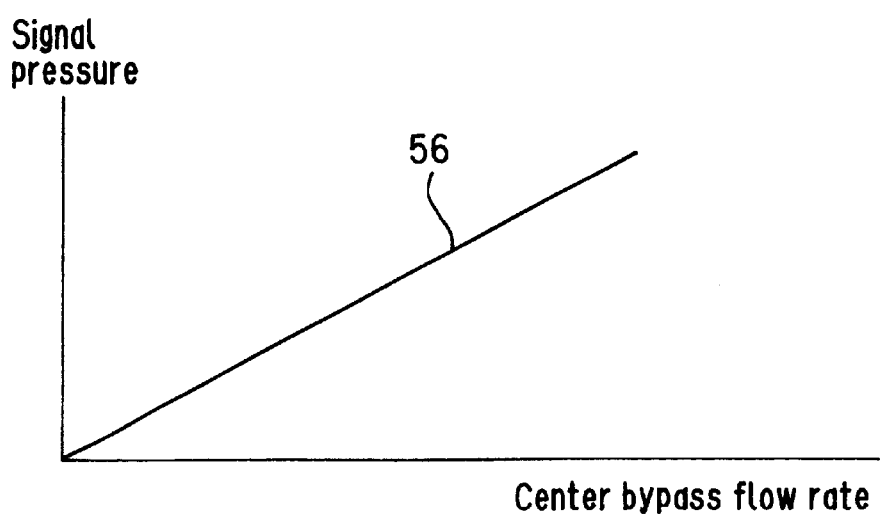
FIG. 11 is a diagram illustrating a center bypass flow rate/signal pressure characteristic available from the third embodiment shown in FIG. 8.

FIG. 8 is a hydraulic circuit diagram showing a third embodiment of the present invention, FIG. 9 is a block diagram illustrating the construction of a tilting control unit arranged in the third embodiment shown in FIG. 8, FIG. 10 is a diagram illustrating a pump output characteristic available from the third embodiment shown in FIG. 8, and FIG. 11 is a diagram illustrating a center bypass flow rate/signal pressure characteristic available from the third embodiment shown in FIG. 8.

In the third embodiment, a directional control valve 25 has a center bypass passage 25a, a restrictor 46 is arranged downstream of the directional control valve 25, and a tilting control signal line 47 is arranged to guide an upstream pressure of the restrictor 46 as a pressure signal.

By the above-mentioned restrictor 46 and tilting control signal line 46 and also by a pressure signal-electric signal conversion unit 60 and function generator 48 included in the tilting control unit 45 to be described subsequently herein, a unit is constructed for controlling the displacement of the variable displacement hydraulic pump 21 so that it increases as the flow rate of pressure oil passing through the center bypass passage 25a of the directional control valve 25 decreases. A relationship between a center bypass flow rate, which is the flow rate of pressure oil passing through the center bypass passage 25a of the directional control valve 25, and the value of a pressure signal as the upstream pressure of the restrictor 46, namely, a signal pressure is such that the signal pressure linearly decreases with a decrease in the center bypass flow rate, for example, as indicated by a characteristic line 56 in FIG. 11.

The tilting control unit 45 for controlling the displacement of the variable displacement hydraulic pump 21 has the construction shown in FIG. 9. Described specifically, the tilting control unit is provided with the pressure signal-electric signal conversion unit 60 connected to the tilting control signal line 47 through which the signal pressure corresponding to the above-mentioned center bypass flow rate is supplied to the tilting control unit 45, and also with the function generator 48 for setting beforehand a relationship between the value of an electrical signal converted at the pressure signal-electric signal conversion unit 60 and a tilting or displacement of the pump. When the directional control valve 25 is maintained at the center valve position, the function generator 48 outputs a minimum pump tiling in response to a signal pressure when the signal pressure is maximum. When the signal pressure gradually decreases as a result of gradual change-over of the directional control valve 25, the function generator 48 outputs a pump tilting which gradually increases in a linear relationship with the signal pressure, whereby the directional control valve 25 is completely changed over. When the signal pressure drops to 0 as a result, the function generator 48 outputs a maximum pump tilting in accordance with the signal pressure.

The tilting control unit 45 is also provided with a pressure signal-electric signal conversion unit 61 connected to the first tilting control signal line 28, a pressure signal-electric signal conversion unit 62 connected to the second tilting control signal line 30, a coefficient unit 49 for multiplying by a predetermined coefficient (gain) K the value of an electric signal converted at the pressure signal-electric signal conversion unit 62, an adder 50 for summing up the value obtained at the coefficient unit 49 and the above-mentioned value obtained at the pressure signal-electric signal conversion unit 61, and a function generator 51 for setting beforehand a relationship between the value (signal pressure) obtained at the adder 50 and the tilting, i.e., displacement of the pump. Similarly to the above-described function generator 48, this function generator 51 also outputs a minimum pump tilting when the signal pressure is maximum, outputs a pump tilting which gradually increases in a curvilinear relationship with the signal pressure when the signal pressure gradually decreases, and outputs a maximum pump tilting when the signal pressure drops to 0.

In addition, the tilting control unit 45 is provided with a lowest selector 52, which compares a pump tilting outputted from the function generator 48 with a pump tiling outputted from the function generator 51, selects the smaller one, and outputs it as a signal for determining the displacement of the variable displacement hydraulic pump 21, and also with a swash plate control device 53 which controls a swash plate of the variable displacement hydraulic pump 21 in accordance with the signal outputted from the lowest selector 52 and is constructed, for example, of a solenoid-operated valve or the like. Incidentally, the swash plate control device 53 is known in the art.

The remaining construction is similar to the corresponding structure of the above-described first embodiment.

In the third embodiment constructed as described above, when the control lever 26 is not operated and the directional control valve 25 is maintained at the center valve position, a signal pressure which is the value of a pressure signal guided to the tilting control unit 45 as a result of an increase of the center bypass flow rate to the maximum also increases to a maximum value in accordance with the characteristic line 56 shown in FIG. 11. This maximum value is converted at the pressure signal-electric signal conversion unit 60 of the tilting control unit 45 and is then inputted to the function generator 48, and a minimum value of pump tilting is then inputted from the function generator 48 to the lowest selector 52. Even when as a result of a decrease in the delivery pressure of the variable displacement hydraulic pump 21, a relatively small pressure signal is inputted to the function generator 51 via the pressure signal-electric signal conversion unit 61 and the adder 50 and a relatively large pump tilting is inputted from the function generator 51 to the lowest selector 52, the minimum value of pump tilting outputted from the function generator 48 is therefore selected at the lowest selector 52 and a signal corresponding to this minimum value of pump tilting is outputted to the tilting control device 53, whereby the tilting, that is, displacement of the variable displacement hydraulic pump is controlled to minimum.

When the directional control valve 25 is changed over from the center valve position to perform, for example, heavy-load work, the center bypass flow rate drops, for example, to 0. As a result, the signal pressure which is inputted from the tilting control line 47 to the function generator 48 via the pressure signal-electric signal conversion unit 60 becomes 0 as indicated by the characteristic line 56 shown in FIG. 11, so that the maximum pump tilting is outputted from the function generator 48 to the lowest selector 52. When the delivery pressure of the variable displacement hydraulic pump 21 becomes high to operate the actuator 24, on the other hand, this high delivery pressure is supplied as a first tilting control signal to the tilting control unit 45, where the high delivery pressure is converted to an electrical signal at the pressure signal-electric signal conversion unit 61 and the electric signal is then supplied to the adder 50. As has been mentioned above, the maximum value NA of target engine speed, said maximum value corresponding to the heavy-load work, is outputted from the target engine speed-indicating unit 35, the command current Ai corresponding to the maximum value NA is obtained at the controller 33 (in accordance with the relationship shown in FIG. 2), and this command current Ai is then outputted as a drive signal to the solenoid-operated proportional valve 32. As a result, the solenoid-operated proportional valve 32 is brought into the fully-closed position so that the tilting control signal supplied to the tilting control unit 45 via the second tilting control signal line 30, namely, the command pressure becomes 0 (in accordance with the relationship shown in FIG. 4). Accordingly, a summed value available at the adder 50 of the tilting control unit 45 is the value converted at the pressure signal-electric signal conversion unit 61, namely, a value corresponding to the delivery pressure of the variable displacement hydraulic pump 21. A pump tilting corresponding to this value is obtained at the function generator 51 and the pump tilting is then inputted to the lowest selector 52. At the lowest selector 52, the above-mentioned pump tilting outputted from the function generator 48 and the pump tilting outputted from the function generator 51 are compared, and the smaller pump tilting is selected. In this case, the pump tilting outputted from the function generator 48 upon fully-opened operation of the directional control valve 25 is the maximum as mentioned above, so that the pump tilting outputted, for example, from the function generator 51 is selected and outputted to the swash plate control device 53. The torque to be absorbed in the pump at this time is of the maximum value TA as indicated by the characteristic line 39 shown in FIG. 5, so that the output torque of the pump takes a large value as indicated by a characteristic curve 55 in FIG. 10, said characteristic curve indicating a relationship between pump pressure and pump tilting.

When the directional control valve 25 is changed over, for example,. to perform light-load work, a maximum pump tilting is outputted by way of example from the function generator 48 to the lowest selector 53 as a result of the change-over operation of the directional control valve 25 as described above.

On the other hand, a delivery pressure which is smaller compared with that produced in the case of the above-described heavy-load work is supplied as a first tilting control signal to the tilting control unit 45 and subsequent to conversion into an electrical signal at the pressure signal-electric signal conversion unit 61, is supplied to the adder 50. As described above, the value NB of target engine speed, said value corresponding to the light-load work, is also outputted at the target engine speed-indicating unit 35, and the command current Bi corresponding to this value NB is outputted as a drive signal from the controller 33 to the solenoid-operated proportional valve 32. As a result, the solenoid-operated proportional valve 32 is brought into a slightly open position as mentioned above, so that the second tilting control signal supplied to the tilting control unit 45 via the second tilting control signal line 30, namely, the command pressure becomes PB (in accordance with the relationship shown in FIG. 4). Therefore, this command pressure PB is converted to an electric signal at the pressure signal-electric signal conversion unit 61, multiplied by the coefficient K at the coefficient multiplier 49, and then supplied to the adder 50. At the adder 50, the value supplied from the coefficient unit 49 and the value converted at the pressure signal-electric signal conversion unit 61, namely, the value corresponding to the delivery pressure of the variable displacement hydraulic pump 21 are summed up. A pump tilting corresponding to the sum is determined at the function generator 51, and the pump tilting is inputted to the lowest selector 52. At the lowest selector 52, the pump tilting outputted from the function generator 48 and the pump tilting outputted from the function generator 51 are compared, and the smaller pump tilting is selected. Since the pump tilting outputted from the function generator 48 becomes the maximum as a result of fully-open operation of the directional control valve 25 as mentioned above, the pump tilting outputted from the functional generator 51 is selected and outputted to the swash plate control device 53. As a consequence, the swash plate control device 53 is operated to control the displacement of the variable displacement hydraulic pump 21. The torque to be absorbed in the pump at this time takes the value TB smaller than the maximum value TA as indicated by the characteristic line 39 in FIG. 5, and the torque to be outputted from the pump becomes as indicated by the characteristic curve 54 in FIG. 10. In FIG. 10, the word "small" means that as a result of change-over of the solenoid-operated proportional valve 32 to the fully-closed position, the second tilting control signal supplied to the tilting control unit 45 via the second tilting control signal line 30, namely, the command pressure is 0 and the torque to be outputted from the pump hence becomes larger, while the word "large" means that owing to the maintenance of the solenoid-operated proportional valve 32 at the fully-open position, the second tilting control signal supplied to the tilting control unit 45 via the second tilting control signal line 30, namely, the command pressure takes the maximum value and the torque to be outputted from the pump hence becomes smaller. By suitably operating the target engine speed-indicating unit 35, the torque to be outputted from the pump can be changed as desired with one indicated by the characteristic curve 55 defining an upper limit.

If a trouble arises in the controller 33 or a trouble arises in an electric system like breaking of a wire connecting the controller 33 and the solenoid-operated proportional valve 32 together in the state that the directional control valve 25 has been operated as described above, a pump tilting is outputted from the function generator 48 to the lowest selector 52 as described above because the directional control valve 25 has been changed over.

Further, a delivery pressure which corresponds to the work to be performed by the hydraulic excavator is supplied as a first tilting control signal to the tilting control unit 45. The delivery pressure is converted to an electric signal at the pressure signal-electric signal conversion unit 61, which is then supplied to the adder 50. As the solenoid-operated proportional valve 32 is brought into the fully-opened position by the above-mentioned trouble in the electric system, a high command pressure PC which is obtained following the characteristic line 38 in FIG. 4 is supplied as a second tilting control signal to the tilting control unit 45 via the second tilting control signal line 30 as described above. This high command pressure PC is then converted to an electric signal at the pressure signal/electric signal conversion unit 62, which subsequent to multiplication by the coefficient K at the coefficient unit 49, is supplied to the adder 50. At the adder 50, the value supplied from the coefficient unit 49 and the above-mentioned value converted at the pressure signal-electric signal conversion unit 61, that is, the value corresponding to the delivery pressure from the variable displacement hydraulic pump 21 are summed up, and a pump tilting corresponding to the sum is determined at the function generator 51 and is then inputted to the lowest selector 52. At the lowest selector 52, the pump tilting outputted from the function generator 48 and the pump tilting outputted from the function generator 51 are compared, and the smaller pump tilting, for example, the pump tilting outputted from the function generator 51 is outputted to the swash place control device 53. As a result, the swash plate control device 53 is operated to control the displacement of the variable displacement hydraulic pump 21. The torque, which is to be absorbed at this time, has a value still smaller than the value TB, i.e., the minimum value TC, both obtained following the characteristic line 39 in FIG. 5, so that torque to be outputted from the pump can be indicated by a characteristic curve 71 shown in FIG. 10.

The engine speed/pump-absorbed torque characteristic available at this time can be indicated by the characteristic line 70 in FIG. 6, so that the relationship between torque to be absorbed in the pump and torque to be outputted from the engine becomes similar to that of the above-described first embodiment. Accordingly, this third embodiment also allows the engine 20 to continue operating without stalling even if the rotational speed of the engine 20 drops while the electric system has such an electric trouble. Accordingly, the work which is being performed by the hydraulic excavator can be performed without needing any special operation, thereby making it possible to avoid a reduction in the ease of work.

Especially when the directional control valve 25 is maintained at the center valve position, the pump tilting, namely, the displacement is maintained at the minimum so that the load to be applied to the engine 20 can be reduced. As a consequence, the fuel consumption can be reduced. The third embodiment is therefore economical.

Figure 12:
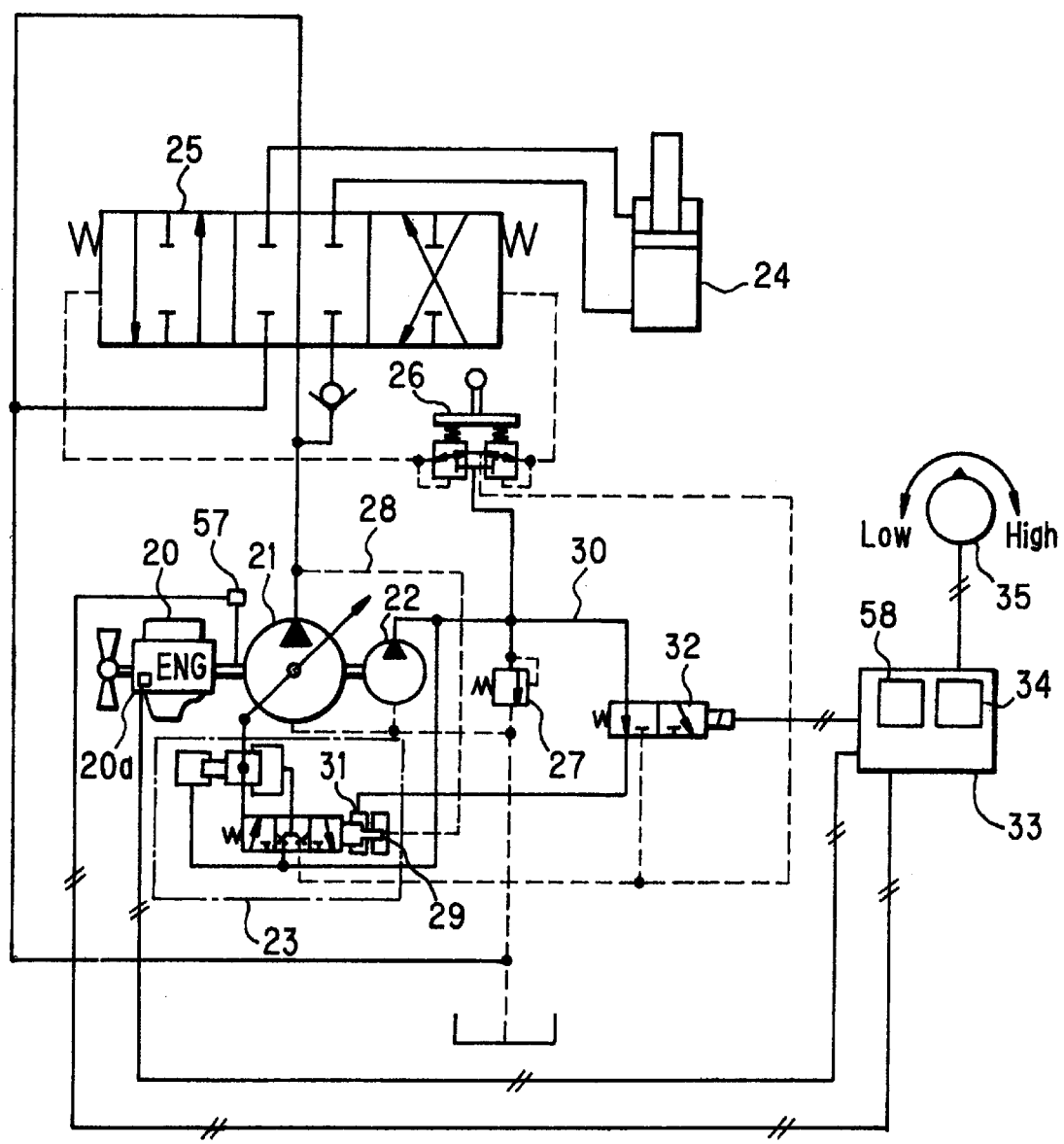
FIG. 12 is a hydraulic circuit diagram illustrating the fourth embodiment of the present invention.
Figure 13:
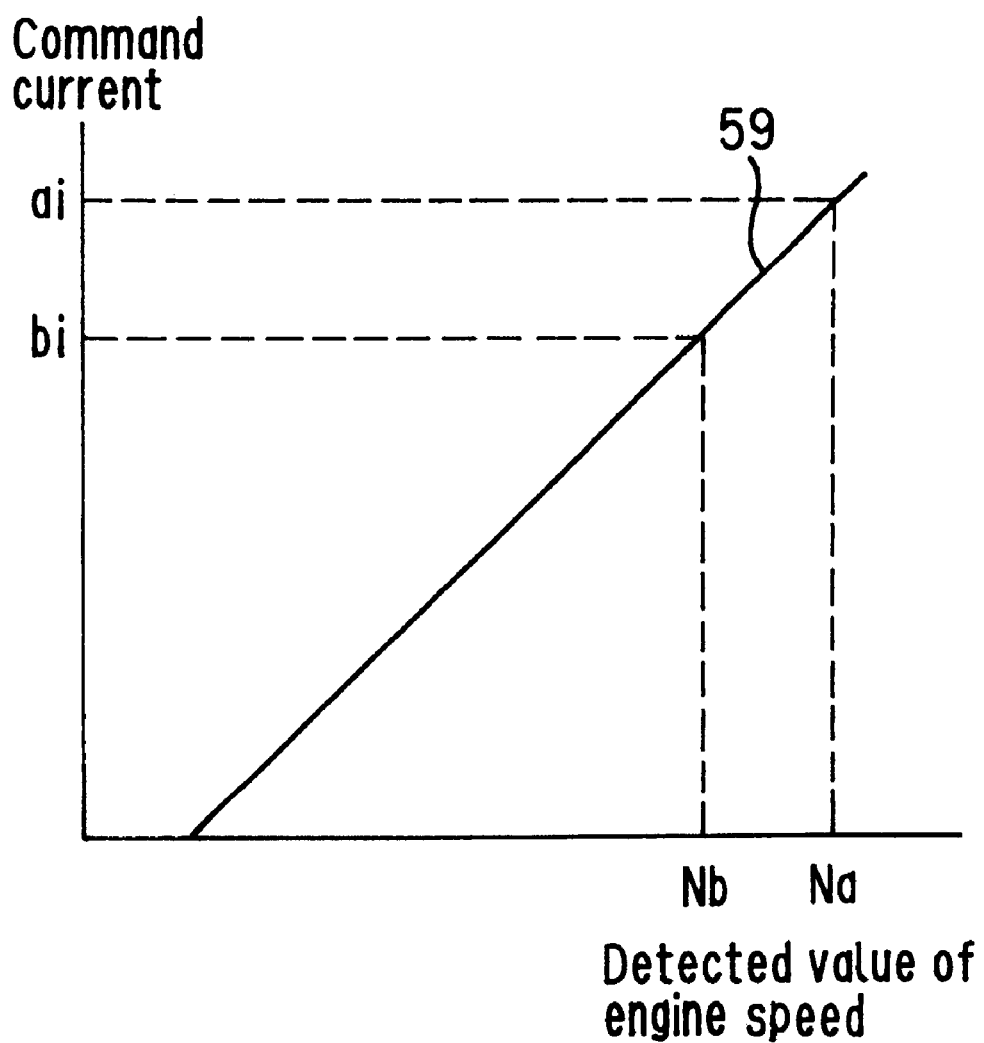
FIG. 13 is a diagram showing a relationship between the detected value of an engine speed, which is set by a command current-setting unit built in a controller arranged in the forth embodiment shown in FIG. 12, and a command current.

FIG. 12 is a hydraulic circuit diagram illustrating the fourth embodiment of the present invention, and FIG. 13 is a diagram showing a relationship between the detected value of an engine speed, which is set by a command current-setting unit built in a controller arranged in the forth embodiment shown in FIG. 12, and a command current.

As an upper limit signal outputting unit for outputting an upper limit signal to a controller 33 to determine the upper limit of torque to be absorbed in the variable displacement hydraulic pump 21, the fourth embodiment is provided with an engine speed detector 57 for detecting an actual rotational speed of the engine 20 in addition to the target engine speed-indicating unit 35 arranged in the above-described first embodiment. In addition to the command current-setting unit 34 for setting the relationship between target engine speed and command current, the controller 33 is internally provided with a command current-setting unit 58 for setting the relationship between the detected value of an engine speed and the command current shown in FIG. 13, namely, a command current-setting unit 58 for setting a relationship between the detected value of an actual engine speed as detected by the engine speed detector 57 and a command current to be outputted as a drive signal to the solenoid-operated proportional valve 32. The relationship between the detected value of engine speed and the command current is set in such a way that the command current increases substantially in proportion to the detected value of engine speed. The controller 33 is designed to perform processing, for example, in such a way that a command current, which is determined by the command current-setting unit 34 in accordance with a target engine speed outputted from the target engine speed-indicating unit 35, and another command current, which is determined by the command current-setting unit 58 in accordance with a detected value of engine speed as outputted from the engine speed detector 57, are summed up, the average of the sum is obtained, and the average of the command currents is outputted as a drive signal to the solenoid-operated proportional valve 32. The remaining construction is similar to the corresponding construction of the above-described first embodiment shown in FIG. 1.

Now assume that in the fourth embodiment constructed as described above, the target engine speed-indicating unit 35 is operated, for example, to perform heavy-load work, the maximum value NA of the target engine speed is inputted to the controller 33, and the engine 20 is hence operated via the fuel injector 20a. As a result, an actual rotational speed of the engine 20 is detected through the engine speed detector 57 as the detected value Na of engine speed shown in FIG. 13, and the detected value Na of engine speed is inputted to the controller 33. The command current-setting unit 34 of the controller 33 determines, based on the relationship shown in FIG. 2, a command current Ai in accordance with the thus-inputted maximum value NA of the target engine speed. Further, the command current-setting unit 58 determines, based on the relationship shown in FIG. 13, a command current ai in accordance with the thus-inputted detected value Na of engine speed. The thus-determined command currents Ai and ai are summed up, the average of the sum is obtained, and the average of the command current is outputted as a drive signal to the solenoid-operated proportional valve 32. In this case, the solenoid-operated proportional valve 32 is brought into the fully-open position or the fully-closed position, and the second tilting control signal supplied to the second tilting control signal port 31 of the tilting control unit 23, namely, the command pressure is reduced to 0 or substantially 0, as described above. As a consequence, the tilting control unit 23 controls the displacement of the variable displacement hydraulic pump 21 so that, as indicated by the characteristic line 39 shown in FIG. 5, torque to be absorbed in the pump is set at a large level corresponding to the maximum value TA of torque to be absorbed in the pump. This makes it possible to perform the desired heavy-load operation.

Also assume that the target engine speed-indicating unit 35 is operated, for example, to perform light-load work, the above-mentioned target engine speed NB is inputted to the controller 33, and the engine 20 is operated accordingly. As a result, an actual rotational speed of the engine 20 is detected through the engine speed detector 57 as the detected value Nb of engine speed shown in FIG. 13, and the detected value Nb of engine speed is inputted to the controller 33. The command current-setting unit 34 of the controller 33 determines, based on the relationship shown in FIG. 2, a command current Bi in accordance with the thus-inputted maximum value NB of the target engine speed. Further, the command current-setting unit 58 determines, based on the relationship shown in FIG. 13, a command current bi in accordance with the thus-inputted detected value Nb of engine speed. The thus-determined command currents Bi and bi are summed up, the average of the sum is obtained, and the average of the command current is outputted as a drive signal to the solenoid-operated proportional valve 32. In this case, the solenoid-operated proportional valve 32 is brought into an open position although the opening is slight, and the second tilting control signal supplied to the second tilting control signal port 31 of the tilting control unit 23, namely, the command pressure is changed to PB or a value close to PB from the relationship shown in FIG. 4. As a consequence, the tilting control unit 23 controls the displacement of the variable displacement hydraulic pump 21 so that from the relationship shown in FIG. 5, torque to be absorbed in the pump is set at the value TB smaller than the maximum value TA or, at a value close to TB. This makes it possible to perform the desired light-load operation.

If a trouble arises in the controller 33 or a trouble arises in an electric system like breaking of a wire connecting the controller 33 and the solenoid-operated proportional valve 32 together in the above-described state, the solenoid-operated proportional valve 32 is maintained at the center valve position, that is, in the fully-open position. Like the above-described first embodiment, a pilot pressure of a large value outputted from the pilot pump 22 is therefore guided as a second tilting control signal, namely, a command pressure PC to the second tilting control signal port 31, whereby the tilting control unit 23 controls the displacement of the variable displacement hydraulic pump 21 so that torque to be absorbed takes a minimum value TC corresponding to the command pressure PC as indicated by the characteristic line 39 shown in FIG. 5. As has been described above, stalling of the engine 20 is therefore not induced even if the rotational speed of the engine 20 is reduced due to such a trouble in the electric system. The desired heavy-load work or light-load work can hence be performed without needing any special operation, thereby making it possible to avoid a reduction in the ease of work.

Further, the fourth embodiment can perform high-accuracy control of the torque to be absorbed in the pump, because the control of the torque to be absorbed is performed while taking into consideration the actual rotational speed of the engine 20 along with the target engine speed.

According to the construction of the fourth embodiment, the target engine speed-indicating unit 35 and the target current-setting unit 34 are arranged to perform the control of torque, which is to be absorbed in the pump, on the basis of both the target engine speed and the actual rotational speed of the engine 20. Where any particularly high accuracy level is required for the control of the torque to be absorbed in the pump, the fourth embodiment may be modified in such a way that the control of torque to be absorbed in the pump is performed based solely on the detected value of engine speed outputted from the engine speed detector 57 instead of relying upon the target engine speed outputted from the target engine speed-indicating unit 35.

This application claims the priority of Japanese Patent Application No. HEI 9-334181 filed Dec. 4, 1997, which is incorporated herein by reference.

What is claimed is:

1. A hydraulic drive system for a hydraulic work vehicle, said system being provided with:
   a motor,
   a variable displacement hydraulic pump operatively driven by said motor,
   a first tilting control signal guide system for guiding, as a first tilting control signal, a delivery pressure of said variable displacement hydraulic pump,
   a second tilting control signal guide system for guiding a second tilting control signal adapted to control torque to be absorbed in said variable displacement hydraulic pump, a unit for generating said second tilting control signal, and a tilting control unit for controlling a displacement of said variable displacement hydraulic pump so that a delivery flow rate of said variable displacement hydraulic pump decreases as a value of said first tilting control signal increases and said torque to be absorbed in said variable displacement hydraulic pump decreases as a value of said second tilting control signal increases, characterized in that said hydraulic drive system comprises:

a controller;

a unit for outputting to said controller an upper limit signal which determines an upper limit of said torque to be absorbed in said variable displacement hydraulic pump; and a control device arranged in said second tilting control signal guide system and operatively controlled by a drive signal outputted from said controller to perform control so that, when said drive signal is not outputted from said controller, said second tilting control signal is maintained at a predetermined large value and, when said drive signal is outputted from said controller in correspondence to said upper limit signal outputted from said upper limit signal output unit and determining said upper limit of said torque to be absorbed in said pump, said value of said second tilting control signal is changed from said predetermined large value to a small value.

2. The hydraulic drive system according to claim 1, wherein:

said second tilting control signal generating unit is a pilot pump operatively driven by said motor, said second tilting control signal is a pilot pressure delivered from said pilot pump, and said second tilting control signal guide system comprises a tilting control signal line for guiding said pilot pressure; and said control device is a solenoid-operated proportional valve arranged in said tilting control signal line.

3. The hydraulic drive system according to claim 1 or 2, wherein said upper limit signal output unit is a target rotational speed indicating unit for indicating a target rotational speed of said motor.

4. The hydraulic drive system according to any one of claims 1–2, wherein said upper limit signal output unit is a mode selector switch arranged in association with modes of work by said hydraulic work vehicle.

5. The hydraulic drive system according to any one of claims 1–2, wherein:

said hydraulic drive system further comprises an actuator, which is operative by pressure oil delivered from said variable displacement hydraulic pump, and a directional control valve arranged in a line, which communicates said variable displacement hydraulic pump and said actuator with each other, and provided with a center bypass passage such that, when said directional control valve is in a center valve position, pressure oil delivered from said variable displacement hydraulic pump is guided to a reservoir but, when said directional control valve is in a valve position other than said center valve position, the pressure oil delivered from said variable displacement pump controls said actuator; and said tilting control unit comprises a unit for controlling a displacement of said variable displacement hydraulic pump so that said displacement increases as a flow rate of pressure oil, which is flowing through said center bypass passage, decreases.

6. The hydraulic drive system according to any one of claims 1–2, wherein said upper limit signal output unit is a rotational speed detector for detecting an actual rotational speed of said motor.

7. The hydraulic drive system according to any one of claims 1–2, wherein said hydraulic work vehicle is a hydraulic excavator.

* * * * *